US009781818B2

(12) United States Patent
Twarog et al.

(10) Patent No.: US 9,781,818 B2
(45) Date of Patent: Oct. 3, 2017

(54) ASYMMETRIC CONSUMABLES FOR A PLASMA ARC TORCH

(71) Applicant: Hypertherm, Inc., Hanover, NH (US)

(72) Inventors: Peter Twarog, Meriden, NH (US);
Clifford G. Darrow, Lyme, NH (US);
E. Michael Shipulski, Etna, NH (US);
Martin Higgens, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 15/350,742

(22) Filed: Nov. 14, 2016

(65) Prior Publication Data

US 2017/0156198 A1    Jun. 1, 2017

Related U.S. Application Data

(63) Continuation-in-part of application No. 14/297,100, filed on Jun. 5, 2014, now Pat. No. 9,497,845, which is a continuation-in-part of application No. 13/567,260, filed on Aug. 6, 2012, now Pat. No. 9,107,282.

(60) Provisional application No. 62/379,071, filed on Aug. 24, 2016.

(51) Int. Cl.
*B23K 10/00* (2006.01)
*H05H 1/34* (2006.01)

(52) U.S. Cl.
CPC .......... *H05H 1/3405* (2013.01); *B23K 10/00* (2013.01); *H05H 2001/3463* (2013.01)

(58) Field of Classification Search
CPC .......... H05H 1/3405; H05H 1/34; H05H 1/26; H05H 2001/3463; B23K 10/00

USPC .............. 219/121.5, 121.51, 121.48, 121.45, 219/137 R, 137.42

See application file for complete search history.

(56) References Cited

U.S. PATENT DOCUMENTS

| | | | |
|---|---|---|---|
| 3,707,615 A * | 12/1972 | Rotolico | ................. B05B 7/226 |
| | | | 219/121.47 |
| 3,740,522 A | 6/1973 | Muehlberger | |
| 4,423,304 A | 12/1983 | Bass et al. | |

(Continued)

FOREIGN PATENT DOCUMENTS

| | | |
|---|---|---|
| EP | 0634887 A1 | 1/1995 |
| FR | 2672459 A1 | 8/1992 |

OTHER PUBLICATIONS

International Search Report for International Application No. PCT/US2013/051989 dated Jan. 23, 2014, 4 pages.

*Primary Examiner* — Mark Paschall
(74) *Attorney, Agent, or Firm* — Proskauer Rose LLP (57) ABSTRACT

A consumable set is provided that is usable in a plasma arc torch to direct a plasma arc to a processing surface of a workpiece. The consumable set comprises a nozzle and an alignment surface. The nozzle includes: 1) a nozzle body defining a longitudinal axis extending therethrough, and 2) a nozzle exit orifice disposed in the nozzle body for constricting the plasma arc. The nozzle exit orifice defines an exit orifice axis oriented at a non-zero bevel angle relative to the longitudinal axis. The alignment surface is generally parallel to the exit orifice axis and dimensioned to align the exit orifice such that the plasma arc impinges orthogonally on the processing surface of the workpiece. The alignment surface is configured to lay at least substantially flush against a guiding surface angled relative to the processing surface of the workpiece.

20 Claims, 9 Drawing Sheets

(56) References Cited

U.S. PATENT DOCUMENTS

| | | | |
|---|---|---|---|
| 4,839,492 A | | 6/1989 | Bouchier et al. |
| 4,877,937 A | | 10/1989 | Muller |
| 4,970,364 A | | 11/1990 | Muller |
| 5,014,916 A | * | 5/1991 | Trapani .................. B05B 7/205 239/290 |
| D338,142 S | | 8/1993 | Sarkissian |
| 5,278,387 A | | 1/1994 | Borne |
| 5,334,235 A | * | 8/1994 | Dorfman .................. C23C 4/04 420/27 |
| 5,808,270 A | * | 9/1998 | Marantz .................. B05B 7/224 219/121.47 |
| 5,837,959 A | | 11/1998 | Muehlberger et al. |
| 6,114,649 A | | 9/2000 | Delcea |
| 6,262,386 B1 | | 7/2001 | Fornsel |
| 6,353,200 B1 | | 3/2002 | Schwankhart |
| 6,657,152 B2 | | 12/2003 | Shimazu |
| 6,744,006 B2 | | 6/2004 | Johnson et al. |
| 8,624,150 B2 | | 1/2014 | Simek et al. |
| 9,211,603 B2 | | 12/2015 | Severance, Jr. et al. |
| 2004/0140295 A1 | | 7/2004 | Herres |
| 2009/0039059 A1 | | 2/2009 | Twarog et al. |
| 2014/0138360 A1 | | 5/2014 | Hansen et al. |

* cited by examiner

ASYMMETRIC CONSUMABLES FOR A PLASMA ARC TORCH

CROSS REFERENCE TO RELATED APPLICATION

This application is a continuation in part of U.S. Ser. No. 14/297,100, filed Jun. 5, 2014, which is a continuation-in-part of U.S. Ser. No. 13/567,260, filed Aug. 6, 2012, now U.S. Pat. No. 9,107,282, all of which are owned by the assignee of the instant application and the entirety of which are incorporated herein by reference. This application also claims the benefit of and priority to U.S. Provisional Patent Application No. 62/379,071, filed Aug. 24, 2016, the entire content of which is owned by the assignee of the instant application and incorporated herein by reference in its entirety.

FIELD OF THE INVENTION

The present invention relates generally to one or more consumables usable in a plasma arc torch to cut a workpiece at a bevel angle.

BACKGROUND OF THE INVENTION

Thermal processing torches, such as plasma arc torches, are widely used in the heating, cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the plasma arc torch. In operation, the torch produces a plasma arc, which is a constricted jet of an ionized gas with high temperature and sufficient momentum to assist with removal of molten metal.

Figure 1:
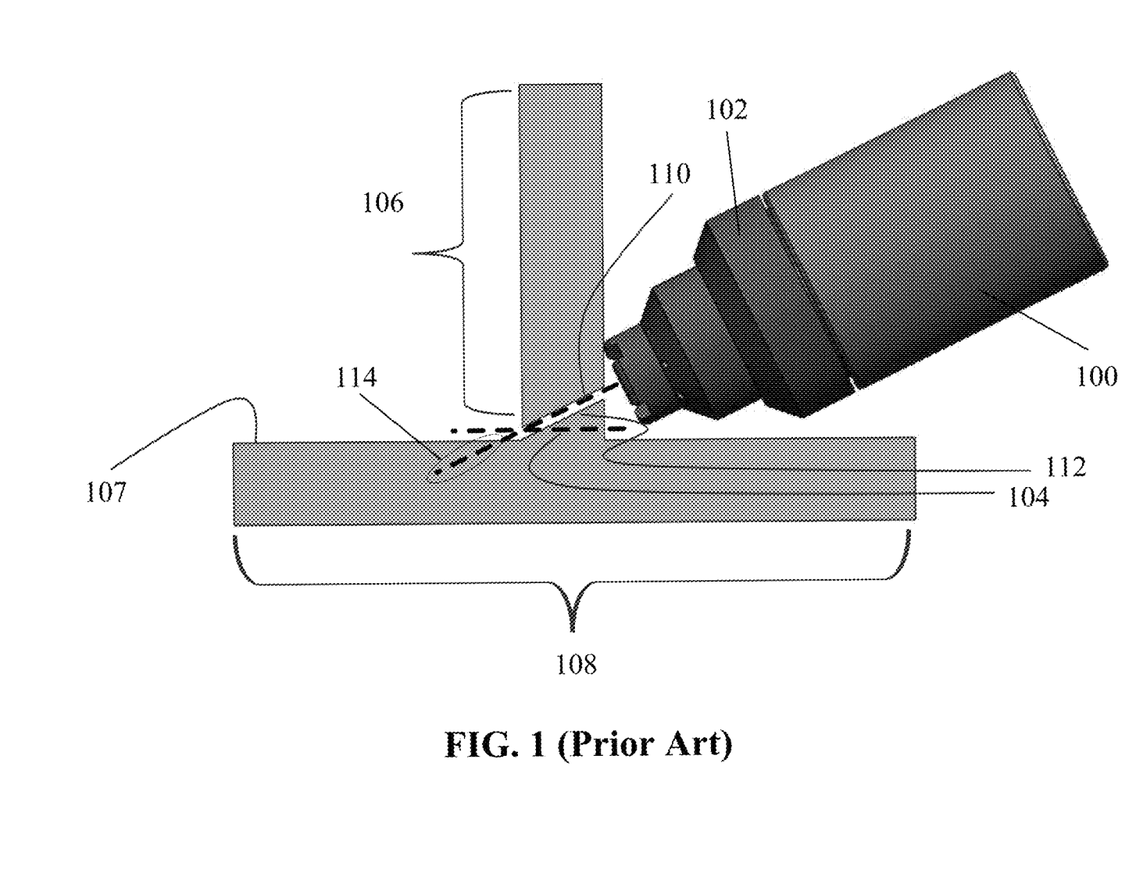
FIG. 1 shows a prior art plasma arc torch for cutting a workpiece.

A problem with existing plasma arc torches, including handheld plasma arc torches, is that they have difficulties flush cutting a workpiece having one or more internal corners due to the axial configuration of the torches. As shown in FIG. 1, a conventional plasma arc torch 100, which includes a rotational symmetric torch tip 102, cannot make a flush cut in the workpiece along the desired path 104. Specifically, the plasma arc torch 100 has difficulty cutting off the protruding flange 106 as close as possible against the horizontal surface 107 of the base 108 without cutting below the horizontal surface 107. Instead, the best cut achievable by the plasma arc torch 100 is indicated by the path 110. As a result, secondary operations, such as grinding, are required to remove the excess workpiece section 112 to achieve the desired flush cut 104. In addition, the closer the plasma arc torch 100 directs a plasma arc flow to the corner of the workpiece, the more likely the arc can inadvertently damage the base 108, such as extending the cut below the horizontal surface 107 of the base 108 along the path 114. Yet another limitation of the plasma arc torch 100 is its inability to ensure that a cut in a workpiece corner is consistently reproducible. For example, the plasma arc torch 100 does not have any positioning mechanism to ensure that the same cut can be made at the same relative location in the corners of different workpieces.

Another problem with existing plasma arc torches, including handheld plasma arc torches, is that they have difficulties cutting a workpiece at a precise bevel angle without the assistance of costly accessories. A bevel cut can be useful in many operations, such as in a welding preparation process for producing a beveled edge in a workpiece that is not perpendicular relative to the face of the workpiece. In general, making bevel cuts can be time-consuming and expensive if traditional welding and grinding methods are used.

Figure 2:
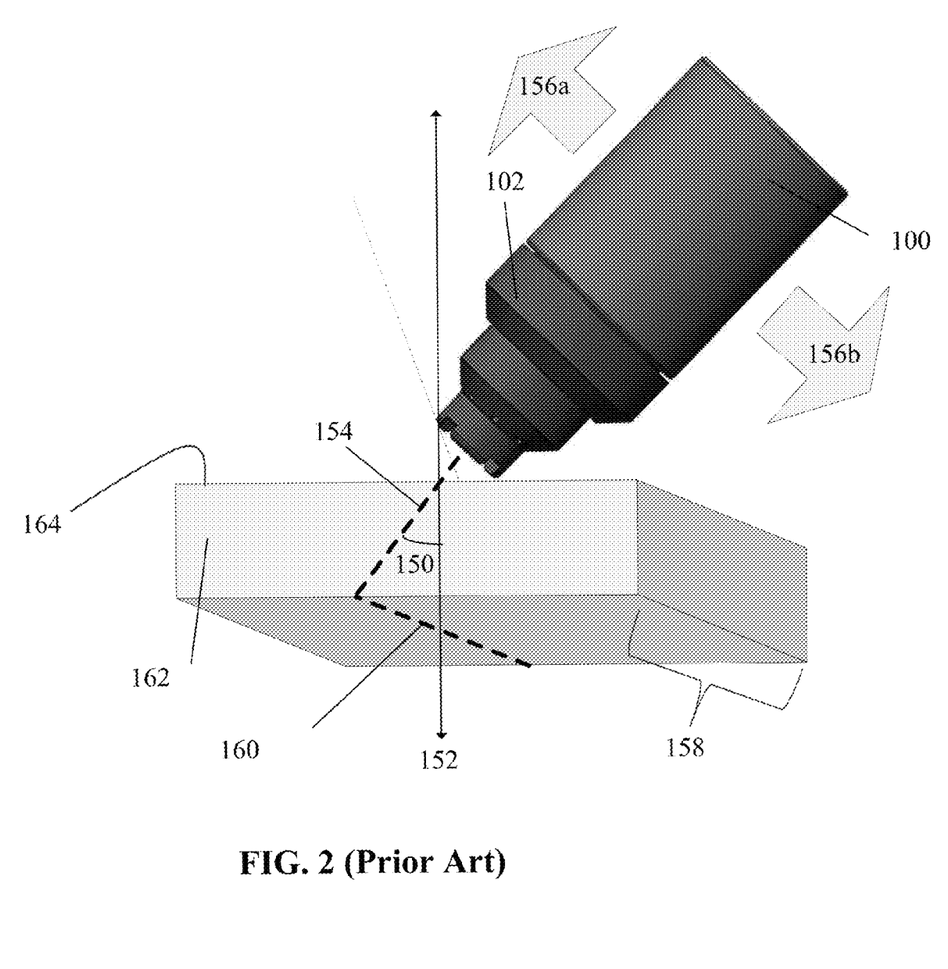
FIG. 2 shows the prior art plasma arc torch of FIG. 1 for cutting another workpiece.

As shown in FIG. 2, a conventional plasma arc torch (e.g., the torch 100 of FIG. 1) has difficulty cutting a path 154 in a workpiece 162 at a desired bevel angle 150 (e.g., 45 degrees) in relation to a longitudinal axis 152 that is perpendicular to a processing surface 164 of the workpiece 162. An operator can inadvertently tilt the torch 100 in either of the directions 156a and 156b, thereby altering the cut path 154 from the desired bevel angle 150 and impact the quality of the resulting bevel cut. The difficulty is exacerbated if the operator wants to use a template for the cut and/or maintain the same cut angle 150 over a cut distance 160 by dragging the torch 100 along the length 158 of the workpiece. Often, the resulting cut includes jagged edges that require secondary operations, such as grinding to smooth the surface of the cut piece and achieve the desired slope. In addition, the plasma arc torch 100 does not have any positioning mechanism to ensure that the same bevel cut can be made over the distance 160 in a single workpiece or in different workpieces to provide consistently reproducible results.

SUMMARY OF THE INVENTION

Thus, systems and methods are needed to perform (i) flush cutting operations close to an internal corner of a workpiece and/or (ii) bevel cutting operations, while minimizing secondary finishing and avoid inflicting damage to any remaining portions of the workpiece. In addition, systems and methods are needed to ensure that the flush and bevel cuts are repeatable and reproducible. These systems and methods can be used in many industrial applications, such as to perform flush cutting in a cargo trailer or ship hull having many internal compartments or bevel cutting on pipes.

In one aspect, a consumable set is provided that is usable in a plasma arc torch to direct a plasma arc to a processing surface of a workpiece. The consumable set includes a nozzle having: 1) a nozzle body defining a longitudinal axis extending therethrough, and 2) a nozzle exit orifice, disposed in the nozzle body, for constricting the plasma arc. The nozzle exit orifice defines an exit orifice axis oriented at a non-zero angle relative to the longitudinal axis. The consumable set also includes an alignment surface generally parallel to the exit orifice axis. The alignment surface is dimensioned to align the exit orifice such that the plasma arc impinges orthogonally on the processing surface.

In some embodiments, the alignment surface is configured to lay at least substantially flush against a guiding surface that is angled relative to the processing surface of the workpiece. The guiding surface can be a portion of a template attachable to the workpiece or the plasma arc torch. In some embodiments, the alignment surface is parallel to the exit orifice axis. The alignment surface can also be within about 10 degrees from being parallel to the exit orifice axis.

In some embodiments, the consumable set further includes a second alignment surface angled relative to the (first) alignment surface. The second alignment surface, in cooperation with the alignment surface, aligns the plasma arc to impinge orthogonally on the processing surface. The consumable set can also include a curved surface for interconnecting the alignment surface and the second alignment surface. The second alignment surface can be configured to contact the processing surface. At least one of the alignment surface or the second alignment surface can be located on an external surface of a nozzle.

In some embodiments, the consumable set includes a third alignment surface angled relative to the alignment surface and the second alignment surface. The third alignment surface, in cooperation with the alignment surface and the second alignment surface, aligns the plasma arc to impinge orthogonally on the processing surface. The third alignment surface can be configured to contact a second guiding surface angled relative to the guiding surface and the processing surface of the workpiece.

In some embodiments, the consumable set further includes a shield having at least one of the alignment surface, the second alignment surface or the third alignment surface.

In some embodiments, the alignment surface includes a rounded portion. The nozzle exit orifice can define an interior opening and an exterior opening along the exit orifice axis. For such a configuration, the distance from a first point on a geometric arc defined by the rounded portion of the alignment surface to the center of the exterior opening of the nozzle exit orifice is at least substantially equal to the distance from a second point on the geometric arc of the rounded portion of the alignment surface to the center of the exterior opening of the nozzle exit orifice. The center of the exterior opening of the nozzle exit orifice can be less than about 0.25 inches from the alignment surface. The exterior opening of the nozzle exit orifice can be located on the second alignment surface angled relative to the alignment surface.

In some embodiments, the nozzle exit orifice is curved or straight. In some embodiments, the nozzle or the alignment surface is coated with an electrically insulating material. In some embodiments, the plasma arc torch is a handheld plasma arc torch.

In another aspect, a nozzle for a plasma arc torch is provided. The nozzle includes a nozzle body having 1) a longitudinal axis extending through the nozzle body, 2) an internal structure generally rotationally symmetric about the longitudinal axis, and 3) an external structure rotationally asymmetric about the longitudinal axis. The nozzle includes an exit orifice that passes between the internal structure and the external structure of the nozzle body for constricting a plasma arc through the exit orifice. The exit orifice is rotationally asymmetric about the longitudinal axis. The nozzle also includes an alignment surface located on the external structure of the nozzle body for guiding the plasma arc to a location of a processing surface of a workpiece.

In some embodiments, the exit orifice of the nozzle defines an exit orifice axis generally parallel to the alignment surface. In some embodiments, the exit orifice axis is oriented at a non-zero angle relative to the longitudinal axis extending through the nozzle body.

In some embodiments, the nozzle further includes a second alignment surface located on the external structure of the nozzle body. The second alignment surface is adapted to contact the processing surface of the workpiece.

In some embodiments, the alignment surface of the nozzle is adapted to contact a guiding surface that guides the plasma arc to impinge on the processing surface. The processing surface of the workpiece can be relatively angled from the guiding surface. For example, the processing surface and the guiding surface can be perpendicular to each other and the plasma arc can impinge orthogonally on the processing surface. In some embodiments, the alignment surface includes a rounded portion.

In another aspect, a torch tip for a handheld plasma arc torch is provided. The torch tip includes a nozzle for generating a plasma arc. The nozzle can include a nozzle body, The torch tip further includes a plasma arc exit orifice located in the nozzle body for constricting the plasma arc. The plasma arc exit orifice defines an exit orifice axis. The torch tip also includes a first portion and a second portion segmented by a plane intersecting the exit orifice axis. The first portion has a smaller volume than the second portion. The torch tip further includes an alignment surface located on an outer surface of the first portion of the torch tip to guide the plasma arc to impinge orthogonally on a processing surface of a workpiece. The distance between the exit orifice axis and the alignment surface can be less than 0.5 inches, less than 0.25 inches or less than 0.125 inches.

In some embodiments, the exit orifice axis is located at a non-zero angle from a longitudinal axis extending through the nozzle body.

In some embodiments, the torch tip includes a second alignment surface located on an outer surface of the second portion of the torch tip. The second alignment surface is configured to contact the processing surface of the workpiece. In some embodiments, the first portion of the torch tip is about ⅓ or less of the volume of the second portion.

In another aspect, a method of manufacturing a consumable set is provided that is usable in a plasma arc torch for directing a plasma arc to a processing surface of a workpiece. The method includes fabricating a nozzle body having a longitudinal axis extending therethrough and forming a nozzle exit orifice in the nozzle body oriented at a non-zero angle relative to the longitudinal axis of the nozzle body. The nozzle exit orifice is dimensioned to constrict the plasma arc passing therethrough. The method further includes locating an alignment surface on the nozzle body that is generally parallel to the nozzle exit orifice axis. The alignment surface is dimensioned to align the plasma arc exiting the nozzle exit orifice to impinge orthogonally on the processing surface.

In some embodiments, the method further includes fabricating a shield including: 1) the alignment surface and 2) a shield exit orifice coplanar with the nozzle exit orifice for delivering the plasma arc to impinge on the processing surface of the workpiece.

Systems and methods of the present technology can consistently produce good quality bevel cuts, especially drag cutting over various distances. When making such bevel cuts, the torch does not have to be held at a fixed angle, thus reducing cut inconsistencies and the need for skilled operators, costly accessory tool(s) (e.g., mechanized tools) and/or secondary refinement work. These systems and methods also make possible the use of templates for making bevel cuts.

In another aspect, a consumable set is provided that is usable in a plasma arc torch to direct a plasma arc to a processing surface of a workpiece. The consumable set comprises a nozzle and an alignment surface. The nozzle includes: 1) a nozzle body defining a longitudinal axis extending therethrough, and 2) a nozzle exit orifice disposed in the nozzle body for constricting the plasma arc. The nozzle exit orifice defines an exit orifice axis oriented at a non-zero bevel angle relative to the longitudinal axis. The alignment surface is located on an external surface of the nozzle and is generally parallel to the longitudinal axis and substantially planar. The alignment surface is dimensioned to orient the nozzle exit orifice such that the plasma arc impinges on the processing surface of the workpiece at the bevel angle while the plasma arc torch is positioned substantially perpendicular to the processing surface.

In some embodiments, the consumable set includes a second alignment surface located on an external surface of the nozzle and substantially perpendicular to the alignment surface. The second alignment surface, in cooperation with the (first) alignment surface, aligns the plasma arc to impinge on the processing surface. The second alignment surface can be configured to contact the processing surface of the workpiece. For example, the second alignment surface can be oriented to lay substantially parallel over the processing surface of the workpiece perpendicular to the longitudinal axis. The consumable set can further include a curved external surface of the nozzle for interconnecting the alignment surface and the second alignment surface. In some embodiments, the consumable set further comprises a shield including at least one of the alignment surface or the second alignment surface.

In some embodiments, the alignment surface is configured to slidingly contact a guiding surface of a template, which is attachable to the workpiece or the plasma arc torch. For example, the alignment surface can lay at least substantially flush against the guiding surface of the template. The alignment surface can include a set of bearings coupled to the alignment surface to slidingly contact the guiding surface.

In some embodiments, the bevel angle is between about 20 and 60 degrees relative to the longitudinal axis. For example, the bevel angle can be about 22.5, 37.5 or 45 degrees relative to the longitudinal axis.

In some embodiments, the nozzle exit orifice defines an interior opening and an exterior opening along the exit orifice axis. The center of the exterior opening of the nozzle exit orifice can be less than about 0.25 inches from the alignment surface. The exterior opening of the nozzle exit orifice can be located on the second alignment surface.

In some embodiments, the nozzle or the alignment surface is coated with an electrically insulating material.

In some embodiments, the plasma arc torch is a handheld plasma arc torch.

In some embodiments, the alignment surface being generally parallel to the longitudinal axis comprises the alignment surface within about 10 degrees from being parallel to the longitudinal axis.

In another aspect, a method of manufacturing a consumable set is provided for a plasma arc torch capable of directing a plasma arc to a processing surface of a workpiece. The method includes fabricating a nozzle body having a longitudinal axis extending therethrough. The method also includes forming a nozzle exit orifice in the nozzle body oriented at a non-zero bevel angle relative to the longitudinal axis of the nozzle body. The nozzle exit orifice is dimensioned to constrict the plasma arc passing therethrough. The method further includes locating an alignment surface on the nozzle body, where the alignment surface is generally parallel to the longitudinal axis. The alignment surface is dimensioned to align the plasma arc exiting the nozzle exit orifice to impinge on the processing surface of the workpiece at the bevel angle while the plasma arc torch is oriented substantially perpendicular to the processing surface.

In some embodiments, the method further includes fabricating a shield including: 1) the alignment surface and 2) a shield exit orifice coplanar with the nozzle exit orifice for delivering the plasma arc to impinge on the processing surface. The method can further include fabricating the alignment surface to slidingly contact a guiding surface of a template.

The method can further include locating a second alignment surface on an external surface of the nozzle substantially perpendicular to the alignment surface. An exterior opening of the nozzle exit orifice can be located on the second alignment surface.

In some embodiments, the bevel angle is between about 20 and 60 degrees relative to the longitudinal axis.

In yet another aspect, a nozzle for a manual plasma arc torch is provided. The nozzle includes a nozzle body, an exit orifice, and a substantially planar alignment surface. The nozzle body includes 1) a longitudinal axis extending through the nozzle body, 2) an internal structure generally rotationally symmetrical about the longitudinal axis, and 2) an external structure disposed about the longitudinal axis. The exit orifice extends between the internal structure and the external structure of the nozzle body for constricting a plasma arc. The exit orifice is rotationally asymmetric about the longitudinal axis and defines an exit orifice axis at a non-zero bevel angle relative to the longitudinal axis. The alignment surface is located on the external structure of the nozzle body for orienting the exit orifice axis relative to a processing surface of a workpiece.

In some embodiments, the alignment surface is generally parallel to the longitudinal axis. In some embodiments, the alignment surface is adapted to contact a guiding surface of a template configured to guide the plasma arc to impinge on the processing surface of the workpiece. The processing surface and the guiding surface can be oriented substantially perpendicular relative to each other to cooperatively guide the plasma arc to impinge on the processing surface at the bevel angle.

In some embodiments, the nozzle further includes a second alignment surface located on the external structure of the nozzle body. The second alignment surface is adapted to contact the processing surface. The second alignment surface can be generally perpendicular to the longitudinal axis.

In yet another aspect, the nozzle and/or shield of the present invention is clocked (e.g., adjusted and then locked into position about other consumables and/or relative to the torch) between operations. For example, the nozzle and/or shield can have a set of predetermined orientations (e.g., 30 degree increments) to be clocked into such that these consumables are oriented at a specific angle relative to the torch (e.g., the torch handle, trigger, operator interface, etc.). The nozzle and/or shield can be asymmetric.

In some embodiments, a consumable set usable in a plasma arc torch is provided to direct a plasma arc to a processing surface of a workpiece. The plasma arc torch defines a torch body. The consumable set comprises a nozzle including: 1) a nozzle body defining a longitudinal axis extending therethrough, and 2) a nozzle exit orifice, disposed in the nozzle body, for constricting the plasma arc. The nozzle exit orifice defines an exit orifice axis oriented at a non-zero angle relative to the longitudinal axis. The consumable set also includes an alignment surface being dimensioned to align the exit orifice such that the plasma arc impinges at one of a beveled angle or an orthogonal angle on the processing surface of the workpiece. The alignment surface is configured to lay at least substantially flush against a guiding surface angled relative to the processing surface of the workpiece. The consumable set further includes a clocking element configured to attach the nozzle to the torch body while orienting the nozzle at a selected angle relative to the torch body to facilitate impingement at the beveled angle or the orthogonal angle It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 3:
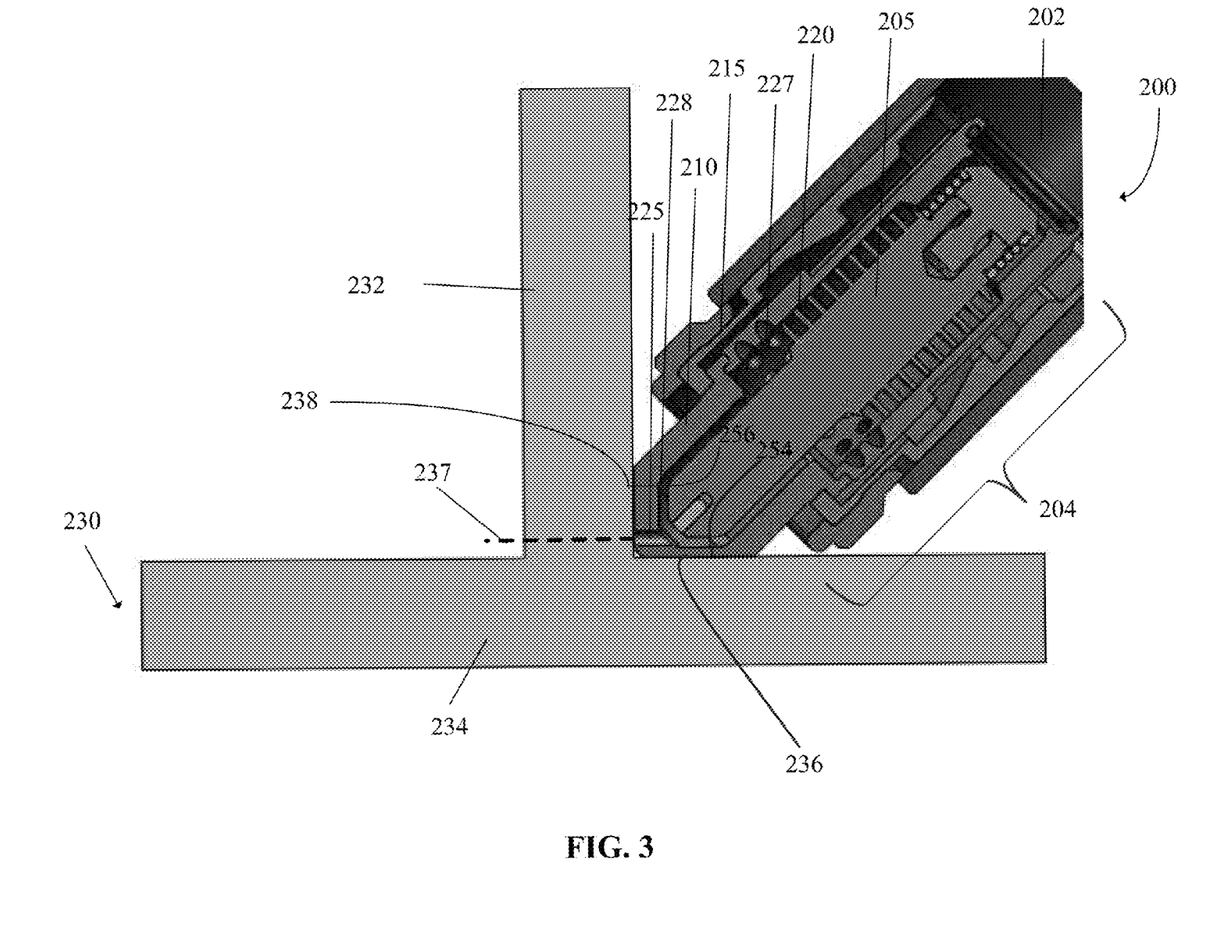
FIG. 3 shows an exemplary plasma arc torch for cutting a workpiece.

FIG. 3 shows an exemplary plasma arc torch 200 for cutting a workpiece according to some embodiments of the present technology. The plasma arc torch 200 includes a torch body 202 and a torch tip 204. The torch tip 204 includes multiple consumables, for example, an electrode 205, a nozzle 210, a retaining cap 215 and a swirl ring 220. The torch tip 204 can also include a shield (not shown). The torch body 202, which has a generally cylindrical shape, supports the electrode 205 and the nozzle 210. The nozzle 210 is spaced from the electrode 205 and has a central exit orifice 225 mounted within the torch body 202. The swirl ring 220 is mounted to the torch body 202 and has a set of radially offset or canted gas distribution holes 227 that impart a tangential velocity component to the plasma gas flow, causing the plasma gas flow to swirl. If a shield is present, the shield includes a shield exit orifice and is connected (e.g., threaded) to the retaining cap 215. The retaining cap 215 as shown is an inner retaining cap securely connected (e.g., threaded) to the torch body 202. In some embodiments, an outer retaining cap (not shown) is secured relative to the shield. The torch 200 can additionally include electrical connections, passages for cooling, passages for arc control fluids (e.g., plasma gas), and a power supply. In some embodiments, the consumables include a welding tip, which is a nozzle for passing an ignited welding gas.

In operation, a plasma gas flows through a gas inlet tube (not shown) and the gas distribution holes 227 in the swirl ring 220. From there, the plasma gas flows into a plasma chamber 228 and out of the torch 200 through the exit orifice 225 of the nozzle 210 that constricts the plasma gas flow. A pilot arc is first generated between the electrode 205 and the nozzle 210. The pilot arc ionizes the gas passing through the nozzle exit orifice 225. The arc then transfers from the nozzle 210 to a workpiece 230 for thermally processing (e.g., cutting or welding) the workpiece 230. In some embodiments, the nozzle 210 is suitably configured to be positioned as close as possible to an inner corner of the workpiece 230 created by a protruding flange 232 and a horizontal portion 234. The nozzle 210 can guide a plasma gas flow through the exit orifice 225 such that the plasma gas impinges orthogonally on the flange 232 as the plasma gas exits from the orifice 225, thereby cutting the flange 232 from the workpiece 230 along the path 237. It is noted that the illustrated details of the torch 200, including the arrangement of the components, the direction of gas and cooling fluid flows, and the electrical connections, can take a variety of forms. In addition, even though the flange 232 and the horizontal portion 234 of the inner corner are illustrated as being perpendicular to each other, the two portions of the workpiece 230 can be oriented at any angle and the nozzle 210 can be suitably configured to perform flush cutting in the resulting inner corner.

Figure 4A:
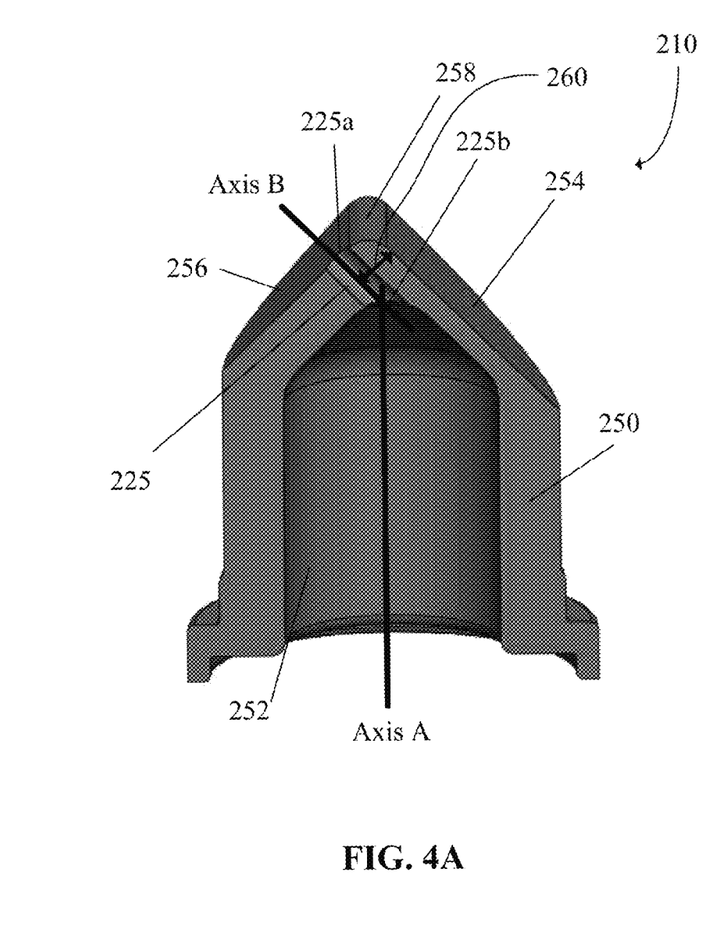
FIGS. 4A-B show various perspectives of an exemplary nozzle configuration of FIG. 3.
Figure 4B:
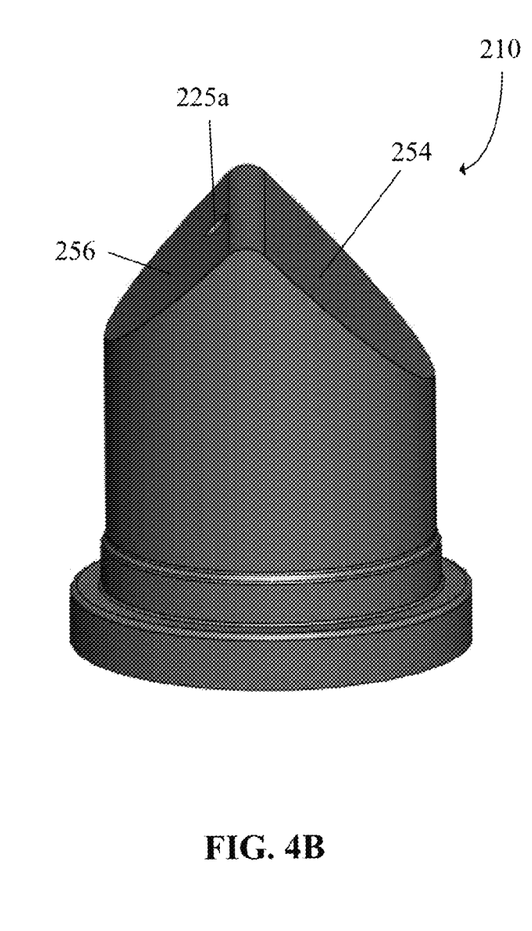

FIGS. 4A and 4B show various perspectives of an exemplary configuration of the nozzle 210 designed to facilitate inner-corner flush cutting operations. The nozzle 210 includes a nozzle body 250 defining a longitudinal axis A extending therethrough. An interior surface 252 of the nozzle 210 can be rotationally symmetrical about the longitudinal axis A while the exterior of the nozzle body 250 can be rotationally asymmetric about the longitudinal axis A. The nozzle exit orifice 225, disposed in the nozzle body 210, defines an exit orifice axis B extending longitudinally along the length of the nozzle exit orifice 225 from an interior opening 225b to an exterior opening 225a. The exit orifice axis B can be oriented at a non-zero angle relative to the longitudinal axis A. That is, the nozzle exit orifice 225 can be rotationally asymmetric about the longitudinal axis A. The nozzle exit orifice 225 is configured to introduce a plasma arc flow from the interior opening 225b, which is in fluid communication with the interior surface 252 of the nozzle 210, to a workpiece through the exterior opening 225a. Even though the nozzle exit orifice 225 is shown as being substantially straight, in other embodiments, the nozzle exit orifice 225 can be curved or have a sequence of non-parallel segments.

In addition, the nozzle 210 includes an alignment surface 254 disposed on the exterior surface of the nozzle body 250. The alignment surface 254 can be generally parallel to the exit orifice axis B, such as exactly parallel to the exit orifice axis B or within about 10 degrees from being parallel to the exit orifice axis B. During torch operation, the alignment surface 254 is dimensioned to lay substantially flush against a guiding surface 236 on the horizontal portion 234 of the workpiece 230, which is a surface that is not being cut by the plasma arc and is used instead to guide and/or position the torch for enhanced flush cutting of the flange 232. Specifically, the alignment surface 254 of the nozzle 210, upon being laid upon the guiding surface 236 of the horizontal portion 234, aligns the external end 225a of the nozzle exit orifice 225 against the processing surface 238 of the flange 232 such that a plasma arc impinges orthogonally onto the processing surface 238 and into the flange 232 along the cut path 237. In some embodiments, the longitudinal axis A of the nozzle body is oriented at an acute angle relative to the alignment surface 254, such as at a 60-degree angle relative to the alignment surface 254. As shown in FIG. 3, the processing surface 238 and the guiding surface 236 of the workpiece 230 are angled relative to each other to form the inner corner of the workpiece 230. Even though the guiding surface 236 is illustrated as a portion of the workpiece 234, in other embodiments, the guiding surface 236 is a portion of a separate template (not shown) used to guide the torch 200 into position. For example, the separate template, which includes the guiding surface 236, can be attached to the torch 200 and/or the workpiece 234 for positioning the torch 200 to perform flush cutting.

In some embodiments, a distance 260 between the center of the exterior opening 225a of the nozzle exit orifice 225 and the alignment surface 254 is less than or equal to about 0.5 inches, 0.25 inches, or 0.1 inches. This distance controls how close the cut path 237 is to the horizontal portion 234 of the workpiece 230. Hence, the smaller the distance 260, the closer the plasma arc torch cuts to the base of the flange 232 from the horizontal portion 234.

In addition to the (first) alignment surface 254, the nozzle 210 can also include a second alignment surface 256 angled relative to the alignment surface 254 and a curved surface 258 that interconnects the two alignment surfaces. During torch operation, the second alignment surface 256, in cooperation with the alignment surface 254, enhances orthogonal impingement of the plasma arc against the processing surface 238 of the flange 232. For example, the second alignment surface 256 can be oriented at an angle from the alignment surface 254 such that the second alignment surface 256 lays substantially flush against the processing surface 238 of the flange 232 while the alignment surface 254 lays substantially flush against the guiding surface 236 of the horizontal portion 234. In addition, the curved surface 258 of the nozzle 210 is configured to inter-fit within the corner created by the processing surface 238 and the guiding surface 236 of the workpiece 230. The two alignment surfaces of the nozzle 210 ensure that the plasma arc torch is positioned tightly and securely into the inner corner of the workpiece 230 while a plasma arc is delivered to the processing surface 238 by the torch 200 via the exterior opening 225a of the nozzle exit orifice 225. As shown in FIGS. 4A and B, the exterior opening 225a of the nozzle exit orifice 225 is located on the second alignment surface 256 of the nozzle 210.

In some embodiments, the first alignment surface 254 and the second alignment surface 256 are substantially perpendicular to each other such that the nozzle 210 can be securely positioned into an inner corner of about 90 degrees. In other embodiments, nozzles with different angles between the alignment surfaces (e.g., 60 degrees, 30 degrees and 15 degrees) can be constructed such that an operator can choose the most appropriate nozzle to perform flush cutting in view of the angle of a given inner corner. In some embodiments, the angle between the first alignment surface 254 and the second alignment surface 256 of a nozzle 210 is adjustable, such that the operator can adjust one or both of the alignment surfaces to produce a secure fit of the nozzle 210 into any given corner of a workpiece. For example, adjustments can be made such that both of the alignment surfaces of the nozzle 210 can contact respect processing surface 238 and guiding surface 236 of the workpiece 230 during a cutting operation.

Figure 5:
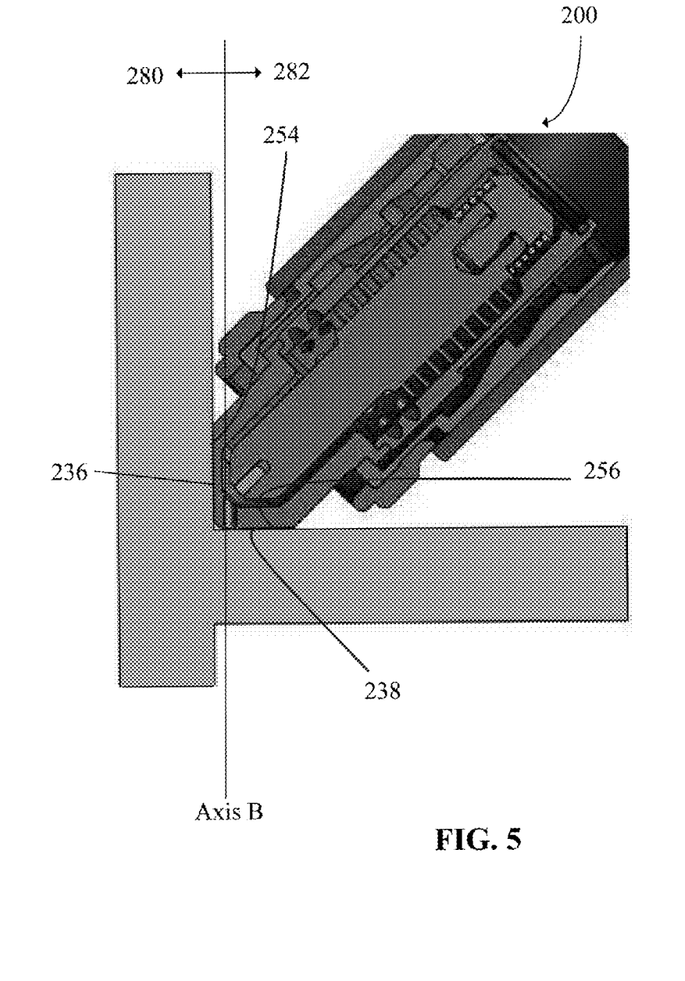
FIG. 5 shows another perspective of the exemplary nozzle of FIGS. 4A-B.

Another approach for illustrating the asymmetric nature of the nozzle 210 is shown in FIG. 5. A plane can be defined to include the exit orifice axis B, thereby segmenting the nozzle 210 into two portions: 1) a first, smaller portion 280 on one side of plane and 2) a second, larger portion 282 on the other side of the plane. The alignment surface 254 of the nozzle 210 is located on the external surface of the first portion 280 and can contact the guiding surface 236 of the workpiece once the torch 200 is positioned into the inner corner of the workpiece. The second alignment surface 256 is located on the external surface of the second portion 282 and can contact the processing surface 238 of the workpiece during a cutting operation. The first portion 280 can be about ⅓, ¼, or ⅕ of the volume of the second portion 282.

Figure 6:
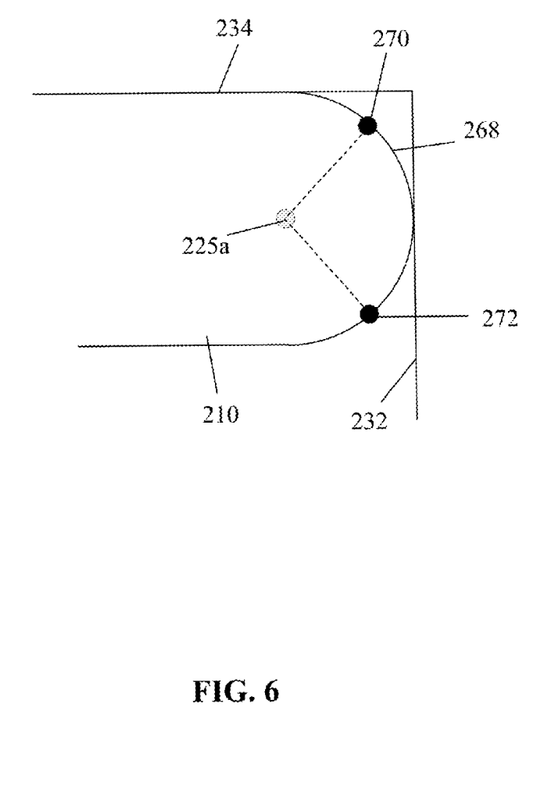
FIG. 6 shows an exemplary alignment surface of the nozzle of FIGS. 4A-B.

In some embodiments, the contour of the alignment surface 254 of the nozzle 210 has at least a rounded-arc portion 268, as shown from a top view of the nozzle 210 in FIG. 6. The rounded-arc portion 268 can be positioned in an inner corner created by the intersection of a horizontal portion 234 and a flange 232 of a workpiece 230. The distance from a first point 270 on the rounded-arc portion 268 to the center of the exterior opening 225a of the nozzle exit orifice 255 is at least substantially equal to the distance from a second point 272 on the rounded-arc portion 268 to the center of the exterior opening 225a. The exterior opening 225a can be located on a second alignment surface 256 of the nozzle 210. Such equidistance configuration ensures that an operator of the plasma arc torch can predict the location on the workpiece to which a plasma arc would be delivered prior to initiating the plasma arc operation, thereby allowing the cutting operation to be repeatable and predictable. In some embodiments, the second alignment surface 256 is designed to include a similar rounded-arc portion.

Figure 7A:
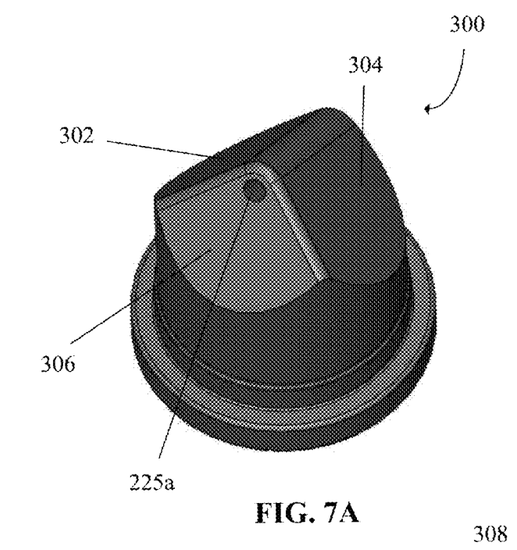
FIGS. 7A-C show various perspectives of another exemplary nozzle configuration.
Figure 7B:
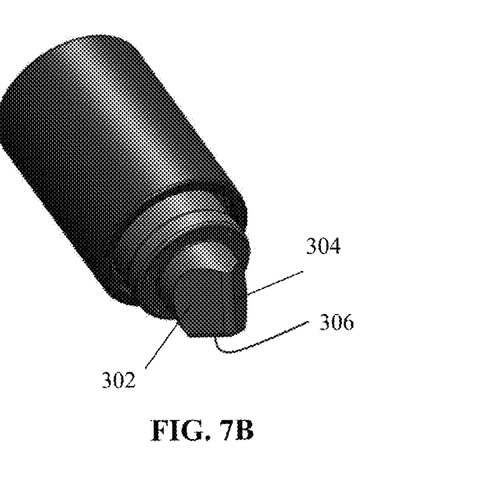
Figure 7C:
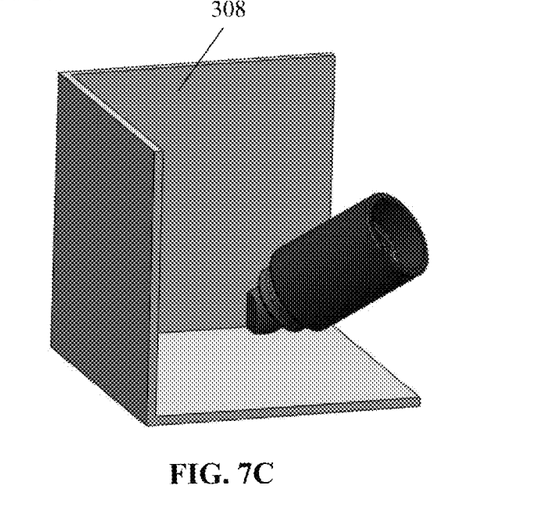

FIGS. 7A-C show various perspectives of another exemplary nozzle 300 that includes three alignment surfaces. Specifically, the nozzle 300 includes i) a (first) alignment surface 302, ii) a second alignment surface 304 angled relative to the alignment surface 302, iii) a third alignment surface 306 angled relative to the alignment surface 302 and the second alignment surface 304; and iv) one or more curved surfaces 310 connecting the three alignment surfaces. The nozzle 300 is configured to perform flush cutting in relation to an inner corner of a workpiece 308 constructed from three surfaces, with the surface being cut referred to as the processing surface and the remaining two surfaces referred to as the guiding surfaces. In other embodiments, the guiding surfaces are disposed on one or more separate templates that are attachable to the workpiece 308 and/or the nozzle 300. In operation, the three alignment surfaces of the nozzle 300, in cooperation with each other, align the plasma arc to impinge orthogonally on the processing surface of the workpiece 308. For example, the alignment surfaces 302 and 304 can lay substantially flush against the two guiding surfaces of the workpiece 308 while the alignment surface 306, which includes the exterior opening 225a of the nozzle exit orifice 225, lays substantially flush against the processing surface of the workpiece 308. The alignment surfaces of the nozzle 300 ensure that the plasma arc torch is positioned tightly and securely into the inner corner of the workpiece 308 while a plasma arc is delivered to the processing surface of the workpiece 308 via the exterior opening 225a. In some embodiments, at least one of the alignment surface 302, the second alignment surface 304, or the third alignment surface 306 has a contour with a rounded-arc portion, similar to the contour illustrated in FIG. 6.

In various embodiments, the asymmetric design described with respect to FIGS. 3-7C can be introduced to a plasma arc torch that includes a shield. In some embodiments, the shield can include at least one of the alignment surface 254 or the second alignment surface 256 describe above with respect to the nozzle 210. In alternative embodiments, the shield can include at least one of the alignment surface 302, the second alignment surface 304, or the third alignment surface 306 describe above with respect to the nozzle 300. The asymmetric shield can further include a shield exit orifice coplanar with the nozzle exit orifice for delivering the plasma arc to impinge on a processing surface of a workpiece. The asymmetric shield, upon installation into a plasma arc torch, can provide similar functions as the asymmetric nozzle 210 or 300, such as allowing an operator to securely and tightly position the torch into an inner corner of a workpiece created by two or three workpiece surfaces, while the torch delivers a plasma arc flow to one of the workpiece surfaces. In some embodiments, the contour of at least one of the alignment surfaces of the asymmetric shield has a rounded-arc portion, similar to the contour illustrated in FIG. 6.

In another aspect, a plasma arc torch with a nozzle is provided for making a bevel cut on a workpiece. The torch can remain perpendicular (e.g., at a fixed 90 degree angle) to the workpiece during the cut operation. Hence, the bevel feature is provided by the nozzle itself, rather than the angularity of the torch. A template can be provided to guide the torch, which is useful in situations where an operator desires to make the bevel cut at a consistent angle over a distance. The plasma arc torch of the present technology can improve the quality of bevel cuts, thereby decreasing the need for secondary processing work or accessories.

Figure 8:
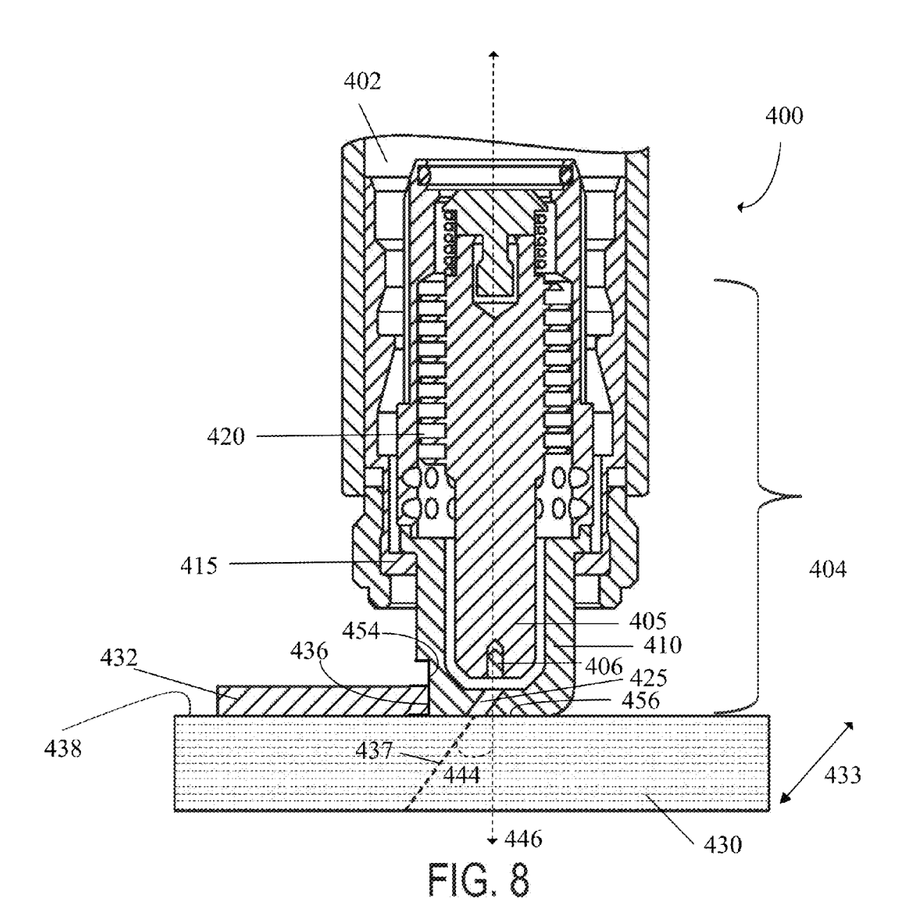
FIG. 8 shows another exemplary plasma arc torch for cutting a workpiece.

FIG. 8 shows an exemplary plasma arc torch for cutting a workpiece at a bevel angle, according to some embodiments of the present technology. The plasma arc torch 400 includes a torch body 402 and a torch tip 404. The torch tip 404 includes multiple consumables, for example, an electrode 405, a nozzle 410, a retaining cap 415 and a swirl ring 420. The torch tip 404 can also include a shield (not shown). The function and configuration of many components of the torch 400, including the electrode 405, retaining cap 415 and swirl ring 420, can be substantially similar to the counterpart components of the plasma torch 200 of FIG. 3.

As shown in FIG. 8, the nozzle 410 is mounted within the torch body 402 in a spaced relationship from the electrode 405. The nozzle 410 has a body defining a longitudinal axis 446 extending therethrough and an exit orifice 425. In operation, a plasma gas flows out of the torch 400 through the exit orifice 425 configured to constrict the plasma gas flow. A pilot arc is first generated between the electrode 405 and the nozzle 410. The pilot arc ionizes the gas passing through the nozzle exit orifice 425. The arc then transfers from the nozzle 410 to a workpiece 430 for thermally processing (e.g., cutting) the workpiece 430. In some embodiments, the nozzle 410 is suitably configured to allow the torch 400 to be positioned substantially perpendicular to a processing surface 438 of the workpiece 430, where the processing surface 438 is defined as a substantially flat surface on the workpiece 430 on which the plasma arc delivered by the torch 400 makes the initial contact. Specifically, the nozzle 410 can guide a plasma gas flow through the exit orifice 425 such that the plasma gas impinges on the processing surface 438 at a bevel angle 444 relative to the longitudinal axis 446 of the nozzle 410, while the torch 400 remains substantially perpendicular to the processing surface 438. This operation cuts the workpiece 430 into two pieces along the path 437. In some embodiments, a template 432 is used to guide and/or position the torch 400 for enhanced bevel cutting of the workpiece 430, especially over a distance along a lengthwise direction 433 of the workpiece 430.

Figure 9A:
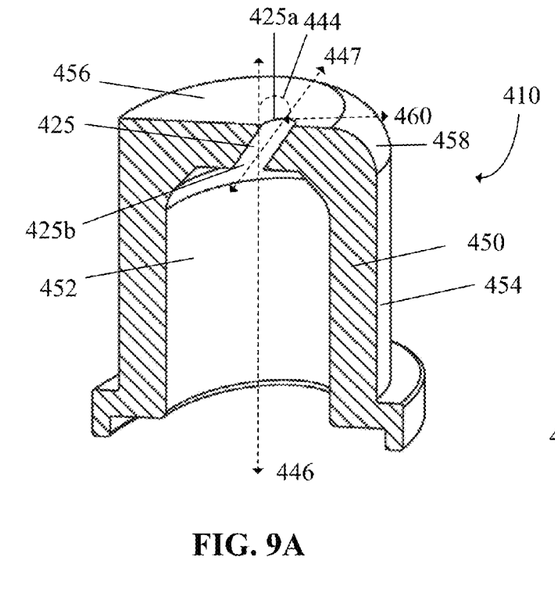
FIGS. 9A-B show various perspectives of an exemplary nozzle configuration of FIG. 8.
Figure 9B:
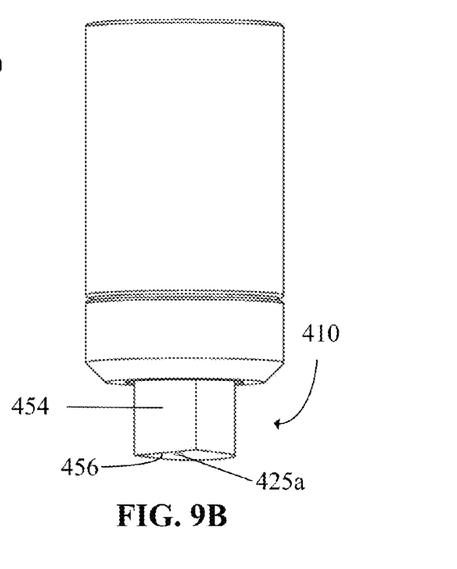

FIGS. 9A and 9B show various perspectives of an exemplary configuration of the nozzle 410 designed to facilitate bevel cutting. The nozzle 410 includes a nozzle body 450 defining the longitudinal axis 446 extending therethrough. An interior surface 452 of the nozzle 410 can be rotationally symmetrical about the longitudinal axis 446. The nozzle exit orifice 425, disposed in the nozzle body 450, defines an exit orifice axis 447 extending longitudinally along the length of the nozzle exit orifice 425 from an interior opening 425b to an exterior opening 425a. The exit orifice axis 447 can be oriented at a non-zero bevel angle 444 relative to the longitudinal axis 446. That is, the nozzle exit orifice 425 can be rotationally asymmetric about the longitudinal axis 446. The non-zero bevel angle 444 can be between about 0 degree and ±90 degrees relative to the longitudinal axis 446, such as between about 20 and about 60 degrees relative to the longitudinal axis 446. An exemplary bevel angle 444 can be 22.5, 37.5 or 45 degrees. The nozzle exit orifice 425 is configured to introduce a plasma arc flow from the interior opening 425b, which is in fluid communication with the interior surface 452 of the nozzle 410, to a workpiece through the exterior opening 425a to cut the workpiece at the non-zero bevel angle 444. Even though the nozzle exit orifice 425 is shown as being substantially straight, in other embodiments, the nozzle exit orifice 425 can be curved or have a sequence of non-parallel segments.

In addition, the nozzle 410 includes an alignment surface 454 disposed on the exterior surface of the nozzle body 450. The alignment surface 454 can be generally parallel to the longitudinal axis 446, such as exactly parallel to the longitudinal axis 446 or within about 10 degrees from being parallel to the longitudinal axis 446. The alignment surface 454 can be substantially planar. In some embodiments, a distance 460 between the center of the exterior opening 425a of the nozzle exit orifice 425 and the alignment surface 454 is less than or equal to about 0.5 inches, 0.25 inches, or 0.1 inches.

During an exemplary torch operation, the alignment surface 454 is dimensioned to slidingly contact (e.g., lay substantially flush against) a guiding surface 436 on the template 432, which is a surface used to guide and/or position the torch 400 for more precise bevel cutting of the workpiece 430, as shown in FIG. 8. Specifically, the alignment surface 454 of the nozzle 410, upon contacting (e.g., being laid flush against) the guiding surface 436 of the template 432, is adapted to orient the plasma arc torch 400 substantially perpendicular to the processing surface 438 of the workpiece 430 such that the external opening 425a of the nozzle exit orifice 425 is aligned against the processing surface 438 of the workpiece 430 to introduce a plasma arc that impinges onto the processing surface 438 at the bevel angle 444 along the cut path 437.

In some embodiments, the guiding surface 436 of the template 432 extends along the lengthwise direction 433 for a specific distance such that an operator can slide the torch 400 against the guiding surface 436 in the lengthwise direction 433 to make a bevel cut at a consistent angle over the distance. In some embodiments, the guiding surface 436 of the template 432 and/or the alignment surface 454 of the torch 400 include a set of bearings (not shown) to facilitate the sliding contact between the two surfaces, such as to reduce the amount of friction between the two surfaces. The template 432 can be attached to or integrally constructed with/from workpiece 430 or the torch 400. The template 432 can also be a separate, stand-alone component.

In addition to the (first) alignment surface 454, the nozzle 410 can also include a second alignment surface 456 substantially perpendicular to the alignment surface 454 and a curved surface 458 that interconnects the two alignment surfaces. In some embodiments, the curved surface 458 is absent and the alignment surfaces 454, 456 are perpendicularly connected to each other. During torch operation, the second alignment surface 456, in cooperation with the alignment surface 454, enhances impingement of the plasma arc against the processing surface 438 of the workpiece 430 at the bevel angle 444. For example, the second alignment surface 456 can be oriented perpendicular to the alignment surface 454 such that the second alignment surface 456 contacts the processing surface 438 of the workpiece 430 while the alignment surface 454 contacts the guiding surface 436 of the template 432. The second alignment surface 456 can lay substantially flush against (i.e., parallel to) the processing surface 438 and substantially perpendicular to the longitudinal axis 446 of the nozzle 410. The two alignment surfaces of the nozzle 410 ensure that the plasma arc torch 400 is positioned substantially perpendicularly against the processing surface 438 of the workpiece 430 while a plasma arc is delivered to the processing surface 238 by the torch 400 via the exterior opening 425a of the nozzle exit orifice 425 at the bevel angle 444. As shown in FIG. 9A, the exterior opening 425a of the nozzle exit orifice 425 is located on the second alignment surface 456 of the nozzle 410.

Figure 10:
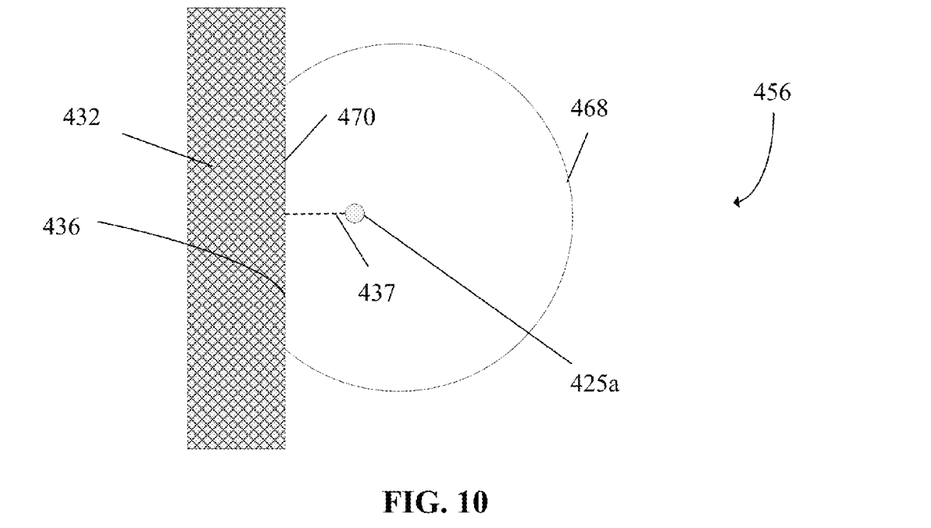
FIG. 10 shows another perspective of the exemplary nozzle of FIGS. 9A-B.

In some embodiments, the contour of the second alignment surface 456 of the nozzle 410 is asymmetric, including at least a rounded-arc portion 468 and a straight portion 470, as shown from a top view of the nozzle 410 in FIG. 10. The straight portion 470 can be located on a side of the second alignment surface 456 close to the alignment surface 454. In operation, the straight portion 470 can be positioned substantially parallel to the guiding surface 436 of the template 432 so as to be guided by the template 432 during cutting. The nozzle exit orifice 225 can be angled such that the plasma arc path 437 is directed toward the straight portion 370 (i.e., the alignment surface 454) as the plasma arc exits the exterior opening 425a located on the second alignment surface 456. In some embodiments, the exterior opening 425a is located off-centered on the second alignment surface 456 (i.e., closer to the straight portion 470 than to the rounded-arc portion 468). This off-centered feature allows the plasma arc to be more easily imparted at a bevel angle closer to the straight portion 470. In contrast, the interior opening 425b (as shown in FIG. 9A) can be centered relative to the nozzle body 450 so as to align with the hafnium insert 406 in the electrode 405. In some embodiments, the use of the template 432 is optional. When the second alignment surface 456 allows the plasma arc torch 400 to be more easily and securely positioned perpendicular to the processing surface 438 of the workpiece 430, the template 432 may not be needed, especially if the distance of the bevel cut in the lengthwise direction 433 is relatively short.

Figure 11:
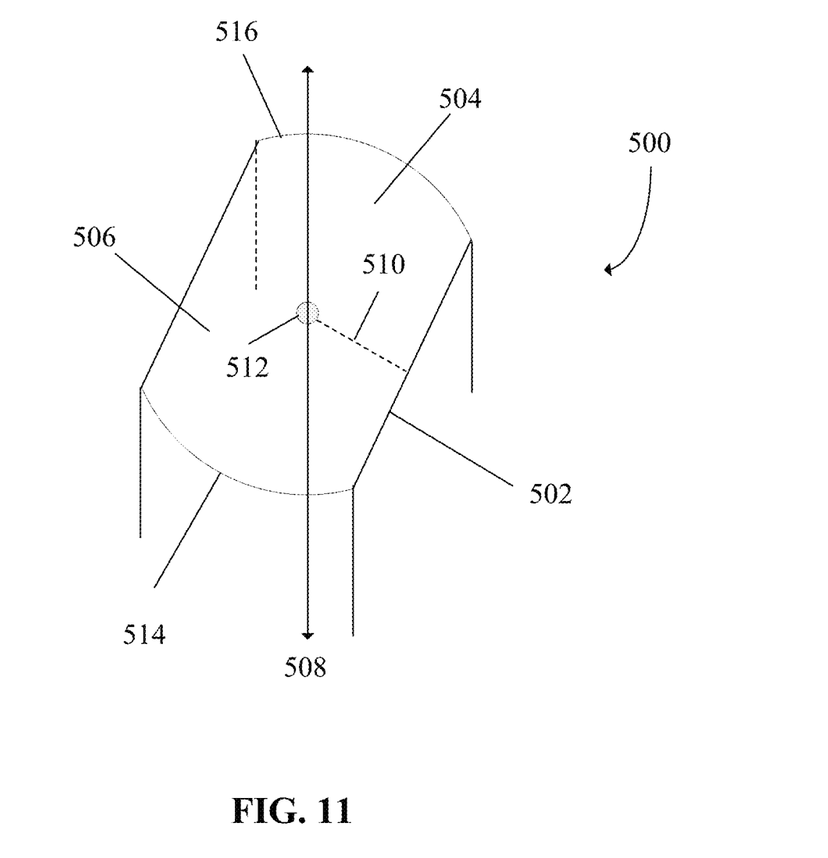
FIG. 11 shows another exemplary nozzle configuration.

FIG. 11 shows another exemplary nozzle 500 that includes three alignment surfaces. Specifically, the nozzle 500 includes i) a (first) planar alignment surface 502, ii) a second planar alignment surface 504 oriented substantially perpendicular to the alignment surface 502 and adapted to contact the processing surface 438 of the workpiece 430 during torch operation, iii) a third planar alignment surface 506 that is oriented substantially perpendicularly to the second alignment surface 504 and substantially parallel to the alignment surface 502, and iv) two arced surfaces 514 and 516. The planar alignment surface 502 functions similar to the alignment surface 454 of the nozzle 410. Specifically, the alignment surface 502 is configured to slidingly contact a first template (not shown) to position the torch while a plasma arc is directed along a cut path 510 toward the alignment surface 502. The second alignment surface 504 functions substantially similar to the second alignment surface 456 of the nozzle 410. Specifically, it is configured to contact the processing surface 438 of the workpiece 430, so as to lay substantially parallel over the workpiece 430 perpendicular to a longitudinal axis 508 of the nozzle 500, while the plasma arc is delivered via an exterior opening 512 located on the second alignment surface 504. The contour of the second alignment surface 504 can be substantially symmetrical. The third alignment surface 506 is configured to slidingly contact a second template (not shown) for positioning the torch while the plasma arc is directed along the cut path 510 away from the third alignment surface 506. In operation, the three alignment surfaces of the nozzle 500, in cooperation with each other, align the plasma arc to impinge on the processing surface of the workpiece at a bevel angle. For example, the alignment surfaces 502 and 506 can lay substantially flush against two templates while the alignment surface 504, which includes the exterior opening 512 of the nozzle exit orifice, lays substantially flush against the processing surface of the workpiece. The alignment surfaces of the nozzle 500 ensure that the plasma arc torch is positioned substantially perpendicularly to the workpiece while a plasma arc is delivered to the processing surface via the exterior opening 512.

In some embodiments, an operator uses both the first and second templates to achieve precise positioning of the nozzle 500 as he makes a cut on the workpiece along the lengthwise direction. The first and second templates can be attached to each other such that they can be positioned around the nozzle simultaneously. In some embodiments, only one template is used, in cooperation with either the alignment surface 502 or the second alignment surface 506, to guide the plasma arc to impinge toward or away from the template. For example, the operator can use only the first template positioned against the alignment surface 502 to guide the nozzle 500 as it cuts in the lengthwise direction toward the template. In some embodiments, the operator uses only the second template positioned against the alignment surface 506 to guide to nozzle 500 as it cuts in the lengthwise direction away from the second template. In some embodiments, the operator does not use a template when making a bevel, especially if the cut distance in the lengthwise direction is short.

In various embodiments, different nozzles can be used to make bevel cuts of different angles, where each nozzle includes a nozzle exit orifice oriented at a different angle in relation to the longitudinal axis of the nozzle body. For example, a kit of nozzle consumables can be provided that includes nozzles for making bevel cuts at 22.5, 37.5, 45 degrees, etc. The kit can also include nozzles having different numbers of guiding surfaces. Furthermore one or more templates can be included in the kit compatible with different nozzle shapes. Hence, an operator can change the nozzle as needed to achieve the desired cut angle and cut distance.

In various embodiments, the features described with respect to FIGS. 8-11 can be introduced to a plasma arc torch that includes a shield. In some embodiments, the shield can include at least one of the alignment surface 454 or the second alignment surface 456 described above with respect to the nozzle 410. In alternative embodiments, the shield can include at least one of the alignment surface 502, the second alignment surface 504, or the third alignment surface 506 described above with respect to the nozzle 500. The shield can further include a shield exit orifice coplanar with the nozzle exit orifice for delivering the plasma arc to impinge on a processing surface of a workpiece. The shield, upon installation into a plasma arc torch, can provide similar functions as the nozzle 410 or 500, such as allowing an operator to maintain the torch at a perpendicular position relative to a processing surface of a workpiece while the torch delivers a plasma arc flow to the processing surface at a bevel angle and over a cutting distance.

In various embodiments, the nozzles and/or shields of the present technology can be coated with an electrically insulating material, such as a ceramic coating. The plasma arc torches, including the nozzles and/or shields, can be constructed as handheld devices or wearable devices attached to a backpack, front-pack, and/or a shoulder strap mounted pack, for example. In addition, the nozzles and/or shields of the present technology can be used in mechanized applications, such as incorporated in X-Y cutting tables, in which case extraneous templates may not be required. For example, if the nozzle 410 or 500 is incorporated in a mechanized torch system to make bevel cuts, no complex equipment is required to manipulate to the torch and no sophisticated software is needed to perform motion control.

It should also be understood that various aspects and embodiments of the invention can be combined in various ways. Based on the teachings of this specification, a person of ordinary skill in the art can readily determine how to combine these various embodiments. A person of ordinary skill in the art can also readily determine how to manufacture the nozzles and/or shields of the present technology. An exemplary manufacturing method can include fabricating the nozzle body 250 (of FIG. 4A) having a longitudinal axis A extending therethrough, forming the nozzle exit orifice 225 in the nozzle body 250 that is oriented at a non-zero angle relative to the longitudinal axis A, and locating at least one alignment surface 254 on an external surface of the nozzle body 250. The method can also include fabricating a shield to include one or more of the above-described elements. Another exemplary manufacturing method can include fabricating the nozzle body 450 (of FIG. 9A) having a longitudinal axis 446 extending therethrough, forming the nozzle exit orifice 425 in the nozzle body 450 oriented at a non-zero bevel angle 444 relative to the longitudinal axis 446, and locating at least one alignment surface 454 on the nozzle body 450 that is generally parallel to the longitudinal axis 446. The bevel angle 444 can be between about 20 to about 60 degrees relative to the longitudinal axis 446. As described above with reference to FIG. 8, the alignment surface 454 can be dimensioned to align the plasma arc exiting the nozzle exit orifice 425 to impinge on the processing surface 438 of the workpiece 430 at the bevel angle 444 while the plasma arc torch 400 is oriented substantially perpendicular to the processing surface 438. The method can also include fabricating a shield to include one or more of the above-described features. In some embodiments, the method of manufacturing can include coating the nozzle and/or shield with an electrically insulating material. The method of manufacturing can further include disposing a set of bearings in/on the alignment surface 454 to reduce an amount of friction created when the alignment surface 454 slidingly contacts the guiding surface 436 of the template 432. In addition, the alignment surface 454 can be fabricated to be substantially planar to facilitate the sliding contact with the guiding surface 436. In some embodiments, the method of manufacturing includes locating a second alignment surface 456 on an exterior surface of the nozzle body 450 that is substantially perpendicular to the alignment surface 454. The exterior opening 425a of the nozzle exit orifice 425 can be fabricated on the second alignment surface 456 to introduce a plasma arc to the workpiece 430. In addition, modifications may occur to those skilled in the art upon reading the specification. The present application includes such modifications and is limited only by the scope of the claims.

What is claimed is:

1. A consumable set usable in a plasma arc torch to direct a plasma arc to a processing surface of a workpiece for cutting the workpiece, the consumable set comprising:
   a nozzle including: 1) a nozzle body defining a longitudinal axis extending therethrough, and 2) a nozzle exit orifice, disposed in the nozzle body, for constricting the plasma arc, wherein the nozzle exit orifice defines an exit orifice axis oriented at a non-zero angle relative to the longitudinal axis; and
   a planar alignment surface generally parallel to the exit orifice axis, the alignment surface being dimensioned to align the exit orifice such that the plasma arc impinges orthogonally on the processing surface of the workpiece to cut the workpiece; and
   an opening at an exterior end of the nozzle exit orifice, wherein a center of the opening of the nozzle exit orifice is less than about 0.25 inches from the alignment surface.

2. The consumable set of claim 1, further comprising a second alignment surface angled relative to the alignment surface, wherein the second alignment surface, in cooperation with the alignment surface, is configured to align the plasma arc to impinge orthogonally on the processing surface of the workpiece.

3. The consumable set of claim 2, wherein the opening of the nozzle exit orifice is located on the second alignment surface.

4. The consumable set of claim 2, further comprising a curved surface for interconnecting the alignment surface and the second alignment surface.

5. The consumable set of claim 2, wherein the second alignment surface is configured to contact the processing surface of the workpiece.

6. The consumable set of claim 2, further comprising a third alignment surface angled relative to the alignment surface and the second alignment surface, wherein the third alignment surface, in cooperation with the alignment surface and the second alignment surface, is configured to align the plasma arc to impinge orthogonally on the processing surface of the workpiece.

7. The consumable set of claim 1, wherein the alignment surface is configured to lay at least substantially flush against a guiding surface of the workpiece.

8. The nozzle of claim 7, wherein the guiding surface comprises a portion of a template attachable to the workpiece or the plasma arc torch.

9. The consumable set of claim 7, wherein the processing surface and the guiding surface are perpendicular to each other on the workpiece and the plasma arc is adapted to impinge orthogonally on the processing surface.

10. The consumable set of claim 1, wherein the alignment surface includes a rounded portion.

11. The consumable set of claim 10, wherein a first distance from a first point on a geometric arc defined by the rounded portion of the alignment surface to the center of the exterior opening of the nozzle exit orifice is at least substantially equal to a second distance from a second point on the geometric arc of the rounded portion of the alignment surface to the center of the exterior opening of the nozzle exit orifice.

12. The consumable set of claim 1, wherein the longitudinal axis of the nozzle body is oriented at an acute angle relative to the alignment surface.

13. The consumable set of claim 1, further comprising an internal structure generally rotationally symmetric about the longitudinal axis, and an external structure rotationally asymmetric about the longitudinal axis, wherein the nozzle exit orifice is configured to pass between the internal structure and the external structure of the nozzle body for constricting the plasma arc therethrough.

14. The consumable set of claim 13, wherein the alignment surface is located on the external structure of the nozzle body.

15. The consumable set of claim 1, further comprising a plane parallel with the alignment surface and centered on the exit orifice axis, the plane separating a first portion of a tip of the nozzle body and a second portion of the tip of the nozzle body, the first portion of the tip of the nozzle body between the plane and the alignment surface, such that a volume of the first portion is less than or equal to about ⅓ of a volume of the second portion.

16. The consumable set of claim 15, wherein the volume of the first portion is less than or equal to about ¼ of the volume of the second portion.

17. The consumable set of claim 15, wherein the volume of the first portion is less than or equal to about ⅕ of the volume of the second portion.

18. The consumable set of claim 15, wherein the alignment surface is located on an outer surface of the first portion of the tip of the nozzle body.

19. The consumable set of claim 1, wherein the center of the exterior opening of the nozzle exit orifice is about 0.125 inches from the alignment surface.

20. A method of manufacturing a consumable set usable in a plasma arc torch to direct a plasma arc to a processing surface of a workpiece for cutting the workpiece, the method comprising:
- fabricating a nozzle including a nozzle body defining a longitudinal axis extending therethrough;
- forming a nozzle exit orifice in the nozzle body oriented at a non-zero angle relative to the longitudinal axis of the nozzle body, the nozzle exit orifice dimensioned for constricting the plasma arc;
- locating a planar alignment surface on the nozzle body that is generally parallel to the nozzle exit orifice axis, the alignment surface being dimensioned to align the nozzle exit orifice such that the plasma arc impinges at an orthogonal angle on the processing surface of the workpiece; and
- defining an opening at an exterior end of the nozzle exit orifice, wherein a center of the opening of the nozzle exit orifice is less than about 0.25 inches from the alignment surface.

* * * * *